United States Patent [19]

Khoury et al.

[11] Patent Number: 5,493,444
[45] Date of Patent: Feb. 20, 1996

[54] PHOTOREFRACTIVE TWO-BEAM COUPLING NONLINEAR JOINT TRANSFORM CORRELATOR

[75] Inventors: Jehad Khoury, Arlington; Charles L. Woods, Stow; Peter D. Gianino, Melrose; Mark Cronin-Golomb, Reading, all of Mass.

[73] Assignee: The United States of America as represented by the Secretary of the Air Force, Washington, D.C.

[21] Appl. No.: 238,032

[22] Filed: Apr. 28, 1994

[51] Int. Cl.$^6$ .......................... G02B 27/42; G02B 27/46; G06E 3/00; G06K 9/76
[52] U.S. Cl. .............. 359/559; 359/7; 359/561; 364/822; 382/210
[58] Field of Search .................... 359/3, 7, 559, 359/560, 561, 564; 364/822; 382/31

[56] References Cited

U.S. PATENT DOCUMENTS

| | | | |
|---|---|---|---|
| 4,695,973 | 9/1987 | Yu | 359/561 |
| 4,832,447 | 5/1989 | Javidi | 359/561 |
| 5,005,927 | 4/1991 | Cudney et al. | 359/7 |
| 5,107,351 | 4/1992 | Leib et al. | 359/561 |
| 5,119,443 | 6/1992 | Javidi et al. | 359/561 |
| 5,150,228 | 9/1992 | Liu et al. | 359/561 |
| 5,282,067 | 1/1994 | Liu | 359/561 |
| 5,337,170 | 8/1994 | Khoury et al. | 359/7 |
| 5,367,579 | 11/1994 | Javidi et al. | 359/561 |

FOREIGN PATENT DOCUMENTS

| | | | |
|---|---|---|---|
| 57-138616 | 8/1982 | Japan | 359/561 |
| 63-307442 | 12/1988 | Japan | 359/561 |

OTHER PUBLICATIONS

Bahram Javidi, "Nonlinear joint power spectrum based optical correlation", Applied Optics, vol. 28, No. 12, 15 Jun. 1989, pp. 2358–2367.

*Primary Examiner*—Martin Lerner
*Attorney, Agent, or Firm*—Robert L. Nathans; Stanton E. Collier

[57] ABSTRACT

An all-optical nonlinear joint transform correlator has been implemented for the first time without using a spatial light modulator and digital processing in the Fourier plane. The correlator utilizes energy transfer from two-beam coupling in the Fourier plane. A compressional nonlinearity in the hard-clipped regime is implemented by pumping a weak plane wave with the intense joint spectrum of the reference and signal images. Operation of this device rivals or exceeds that of the phase-only filter for detecting objects in cluttered noise. Experimental results are compared with both plane wave and beam propagation simulations.

16 Claims, 1 Drawing Sheet

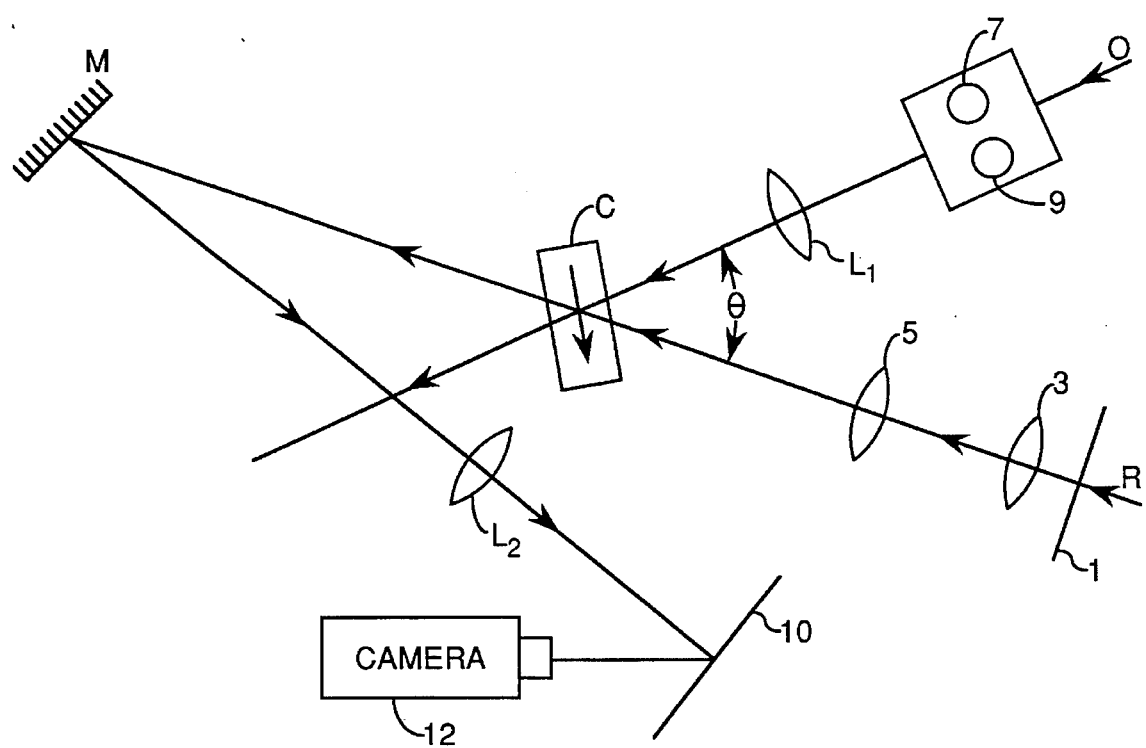

PHOTOREFRACTIVE TWO-BEAM COUPLING NONLINEAR JOINT TRANSFORM CORRELATOR

STATEMENT OF GOVERNMENT INTEREST

The invention described herein may be manufactured and used by or for the Government for governmental purposes without the payment of any royalty therein.

BACKGROUND OF THE INVENTION

The present invention relates to the field of image correlators.

None of the various modifications and improvements of the first photorefractive correlator described in Appl. Phy. Letts 37, 5–7 (1980) have performed as well as the phase-only filter (POF) correlator in terms of peak-to-noise ratio (PNR) and discrimination ability. In accordance with the present invention we present the first photorefractive two-beam coupling joint transform correlator (TBJTC). Furthermore, it is the first nonlinear JTC which operates via the compressional rather than the thresholding principle. Our simulations show that using compression in the hard-clipping limit, the TBJTC outperforms the POF correlator in regard to both SNR (signal-to-noise ratio) and PNR in both noise-free and cluttered environments. To our knowledge, this nonlinear TBJTC is the first implementation of an all-optical nonlinear JTC, requiring neither a spatial light modulator nor intermediate digital processing in the Fourier plane as called for by U.S. Pat. No. 5,119,443 to Javidi and Horner. Moreover, this is the first time that photorefractivity has been used in correlation using purely the phase information.

The classical joint transform correlator (CJTC) requires quadratic processor image sensor in the Fourier transform plane and performs equivalently to a classical matched filter (CMF) optical correlator. Such a correlator may be achieved by using a photorefractive square law detector. Although this filter detects signals in additive Gaussian noise it is well-known that it fails to detect objects in clutter noise. It is possible, however, to improve the discrimination ability, peak-to-noise and peak-to-sidelobe ratios of the CJTC by adding additional nonlinearities in the Fourier plane to increase the weight of the higher spatial frequencies in the signal. A square root nonlinearity applied to the intensity in the Fourier transform plane behaves like a phase-only filter correlator and hard clipping causes it to behave like an inverse filter correlator for noise-free inputs. We show here that energy transfer in photorefractive two-beam coupling provides nonlinear intensity conversion ranging from a square-law to a hard-clipped nonlinearity as the beam ratio increases.

In our experiment we used the light at the joint Fourier transform plane to amplify a weak uniform reference beam in barium titanate. In the diffusion limit of the photorefractive effect, two-beam coupling amplification of a uniform beam by a signal-bearing beam produces an amplified beam bearing a hard-limited quadratically filtered version of the signal beam. Moreover, the high diffraction efficiencies available with barium titanate provide a large dynamic range in the saturation nonlinearity. Our experimental results for simple inputs are supported by two types of computer simulations: an idealized plane wave model and a diffractive beam propagation model. In addition, our simulation using the idealized plane wave model for cluttered images demonstrated SNR performance comparable to the digital nonlinear JTC.

BRIEF SUMMARY OF A PREFERRED EMBODIMENT OF THE INVENTION

The two side-by-side object and reference images are Fourier transformed by a first lens and the joint spectra of the two images interfered with a clean reference beam within a photorefractive crystal. The output of the crystal was Fourier transformed by a second lens and the correlation results were detected by a camera.

BRIEF DESCRIPTION OF THE DRAWING

The sole FIGURE illustrates the interaction of the object and reference beams within the photorefractive crystal and the retrieval of the correlation signals.

DETAILED DESCRIPTION

When two beams intersect inside a photorefractive medium they are coupled to each other by diffraction from an optically induced refractive index grating. This grating is created by migration of charge carriers so that a diffusion field is formed inside the photorefractive medium. Since all of the photorefractive materials are electro-optic, this diffusion field induces changes in the index of refraction.

The plane wave coupled wave equations are as follows $$\frac{dA_1}{dz} = -\frac{\gamma}{I_o} A_1 |A_2|^2 - \frac{\alpha}{2} A_1 \qquad (1)$$

$$\frac{dA_2^*}{dz} = \frac{\gamma}{I_o} A_2^* |A_1|^2 - \frac{\alpha}{2} A_2^* \qquad (2)$$

Here $A_1$ and $A_2$ represent the amplitudes of the two coupling beams, z is the depth along the longitudinal axis, $\alpha$ is the absorption coefficient, $I_o = |A_1|^2 + |A_2|^2$, and $\gamma$ is the photorefractive coupling coefficient.

The general solution of these equations has been presented in reference (13). In the case of diffusive transport of charge carriers in the medium, the coupling constant is real and it is easy to show in that case that $$A_1(x, z) = A_1(x, 0) \sqrt{\frac{1 + m(x)^1}{1 + m(x)^{-1} \exp(\Gamma z)}} \exp\left(-\frac{\alpha}{2} z\right) \qquad (3)$$

$$A_2(x, z) = A_2(x, 0) \sqrt{\frac{1 + m(x)}{1 + m(x)\exp(-\Gamma z)}} \exp\left(-\frac{\alpha}{2} z\right) \qquad (4)$$

where x is the transverse beam coordinate (henceforth implicit), $\Gamma = 2\gamma$ is the intensity coupling constant and $m(x)$, the input beam intensity ratio, is given by $$m = \left| \frac{A_1(0)}{A_2(0)} \right|^2. \qquad (5)$$

In cases where we pump a clean beam $A_2$ by an image bearing signal beam $A_1 g(x)$ (where g(x) corresponds to the amplitude modulation of the signal), m may be replaced by $mg^2$ in Eqs. (3) and (4). For negligible absorption (small $\alpha$) we may rewrite Eq. 4 as:

$$A_2(z) = A_2(0) f(g) \qquad (6)$$

f(g) is the photorefractive two-beam coupling operator, as $$f(g) = \sqrt{\frac{1+mg^2}{1+mbg^2}} \qquad (7)$$

where $b=\exp(-\Gamma L)$ and L is the crystal thickness.

The theoretical basis of the two-beam coupling joint transform correlator is derived from the solutions of the plane wave two-beam coupled wave equations (4) and (7). In the diffusion limit when a clean beam with spatially constant amplitude $A(O)=A_2(x,0)$ is amplified by a beam bearing the joint spectra of two images r and s, the output at the crystal (Fourier) plane can be written from Eqs. (4) and (7) as:

$$A(v_x, v_y) = \qquad (8)$$
$$A(O)\left[\frac{1+m/(\lambda f)^2|R(v_x,v_y)+S(v_x,v_y)|^2}{1+m/(\lambda f)^2|R(v_x,v_y)+S(v_x,v_y)|^2 \cdot \exp(-\Gamma L)}\right]^{1/2}$$

where $v_x$ and $v_y$ are spatial frequencies, m is the beam intensity ratio before passage of the signal beam through transparency bearing the objects $g=|r+s|$, $\lambda$ is the wavelength, f is the focal length, and R and S are the Fourier spectra of r and s, respectively. The magnitudes of the functions r and s lie between 0 and 1 since they represent the transmittance function of the object transparencies. The quadratric term in the above equation is the one responsible for the correlation (the same as in the CJTC). The characteristics of the saturation nonlinearity which is associated with two-beam coupling may be adjusted through the beam ratio m and the gain $\Gamma$. As we will show below, the correlator can be operated in a mode approaching that of an inverse filter correlator if m is chosen to be large. Then the two-beam coupling operation will act as a hard clipping filter.

At the hard clipping limit (m very large) it is possible to approximate the output $A(v_x,v_y)$ of Eq. (8) as $$A(v_x,v_y)=Z_{clip}(R(v_x,v_y)+ S(v_x,v_y)|^2)^0 \qquad (9)$$

$()^0$ indicates the zeroth order nonlinearity and $Z_{clip}$ is defined as $$Z_{clip}=A(0)\exp(\Gamma L/2) \qquad (10)$$

of the prior art. it is possible to write the nonlinear transfer function for the zeroth order nonlinearity as, $$A(v_x, v_y) = Z_{clip} \sum_{k=1}^{\infty} \frac{\epsilon_k \cos(2kx_0 v_x + k\phi_r(v_x,v_y) - k\phi_s(v_x,v_y))}{\Gamma_m(1-k/2)\Gamma_m(1+k/2)} \qquad (11)$$

where $\Gamma_m$ is the mathematical gamma function, $\phi_r(v_x,v_y)$ and $\phi_s(v_x,v_y)$ are the phases of R and S respectively, $x_0$ is the separation between r and s and $\epsilon_k$ is given by $$\epsilon_k = \begin{matrix} 1 & k=0 \\ 2 & k>0 \end{matrix} \qquad (12)$$

Phase-only correlation occurs as shown in Eq. (11) when k=1. The other terms expressed in the equation are higher order terms. Also, we can see from Eqs. (8) and (4) that when m becomes very large the hard-clipped nonlinearity of photorefractive two-beam coupling becomes similar to a zero order nonlinearity; an operation which cannot be achieved by the thresholding techniques of (8).

The value of m cannot be arbitrarily increased, for this would decrease the diffraction efficiency of the grating.

Realistically, m can only be increased to the limit where we can still detect correlation at the output. Such problems when operating in the nonlinear regime have also been observed in deconvolution techniques using photorefractive material.

In our investigation we carried out two different computer simulations. In one we used an idealized plane wave two-beam coupling model of the photorefractive correlator in order to compare the performances of the TBJTC and the CJTC. In the other we used the beam propagation method to account for diffraction effects through the crystal thickness and the effect of the beam crossing angles. These simulations verified the operability of the present invention.

The procedure for two-beam coupling of continuous wave beams involves the following steps:

(1) Write the input field as the sum of the spatial profiles of the interacting beams.

(2) Propagate the input field a short distance dz along the z axis by multiplying its Fourier transform by the transfer function $H(v_x,v_y)$ and taking the inverse Fourier transforms where $H(v_x,v_y)$ is given by $$H(v_x, v_y) = \exp\left[i2\pi\frac{dz}{\lambda}\sqrt{1-\lambda^2(v_x^2+v_y^2)}\right] \qquad (13)$$

where $v_x$ and $v_y$ are the spatial frequencies in the transverse directions.

(3) Use the new optical field intensity I after the propagation step to calculate $\Delta n$, the resulting nonlinear refractive index change, using a suitable model of the nonlinearity. Then multiply the optical field $A(x,z=dz)$ by the corresponding phase transparency $W(x,z=dz)$, $$W(x,y, z=dz)=\exp(ik\,\Delta n\,dz) \qquad (14)$$

where k is the wave propagation number.

(4) Repeat step (1) as many times as needed to step through the interaction region.

In Eq. (14) we use the relation $\Delta n(u,v)=n^3 r_{eff} E(u,v)E_s/2$, where $r_{eff}$ is the effective electro-optic coefficient and E(x,y) is the space charge field in units of the Debye field $E_s = [k_B T N_T/\epsilon]^{1/2}$, $N_T$ is the photorefractive trap density $\epsilon$ is the crystal permittivity, $k_B$ is Boltzmann's constant, and T is the temperature. In the computer model we use an approximation that is valid when $|\nabla^2 E|<<1$, where the spatial derivatives are taken with respect to the dimensionless coordinates u and v, and where $u=k_0 x$ and $v=k_0 y$. $k_0$ is the Debye wavenumber $k_0=e[N_T/(\epsilon k_B T)]^{1/2}$. Normalizing the optical intensity I(u,v) to the dark intensity $I_d$, we find:

$$\begin{pmatrix} \Im^{-1}\left(\frac{-\Im\left[\frac{d}{du}\ln(I+1)\right]_{k_u k_v}}{1+k_\mu^2+k_v^2}\right) \\ \Im^{-1}\left(\frac{-\Im\left[\frac{d}{dv}\ln(I+1)\right]_{k_u k_v}}{1+k_\mu^2+k_v^2}\right) \end{pmatrix} \qquad (15)$$

with derivatives and Fourier transforms ($\Im$) taken with respect to normalized spatial dimensions and $k_u, k_v$, the wave vector numbers in the u and v directions. The predicted outputs of the correlator were satisfactory. The intensity coupling constant used was $\Gamma L=6$ and the half crossing angle outside the crystal was 0.17 radian. 250 steps were taken through a 2.5 mm crystal of $BaTiO_3$ in a 1.0 mm (horizontal)×0.825 mm (vertical) aperture on a 2048×256 grid.

The experimental arrangement for our TBJTC is shown in FIGURE 1. A 20 mw argon laser beam was collimated and divided into two input beams of 2 mm diameter. One of the input beams R passed through a neutral density filter 1 and then was expanded by means of two lenses 3 and 5 to a diameter of 4 mm. Its intensity was $10^{-3}$ mw/mm$^2$. The other object beam O of intensity 1.8 mw/mm² passed through a mask having many pairs of circular holes. Each pair would represent our signal and reference objects 7 and 9. These two objects were Fourier transformed by a lens L1 whose focal length of 16 cm was located at the crystal position. The joint spectra of the two images interfered with the clean reference beam R with diameter 2.5 mm within $BaTiO_3$ crystal C. The external intersection angle theta between the two beams was 20°. The output was Fourier transformed by lens L2 of focal length 13.5 cm. The correlation results were projected onto a white screen 10 and detected by a camera 12.

The experimental results and the beam propagation model indicates that the device resolution is limited. These problems may be minimized in the future by using a reflection grating geometry. This configuration can reduce shearing effects between the interacting beams. Implementing this requires a relatively thin crystal with its c-axis oriented toward the surface of the crystal. In this case, the beam crossing problem is eliminated and the grating spacing is small so that the resolution is very high. In addition, the speed increases because materials with large electro-optic coefficients such as barium titanate have p-type carriers (holes) so that the speed increases with smaller grating spacing. This is in contrast with the sillenite family in which it was observed that the speed decreases with smaller grating spacing. Reference reports use of a ferroelectric crystal $KNbO_3$ having a response time of 5 milliseconds in reflection geometry with large efficiency. This holds the promise of operating our proposed device at video frame rates.

The correlation peak height, in contrast to the degenerate 4-wave mixing JTC (D4WMJTC), is invariant under object-reference spacing in the input plane. The grating in the D4WMJTC is formed by the interference between the Fourier transforms of the object and reference images. Thus, any translation between the object and reference images changes the photorefractive grating spacing and, hence, correlation efficiency. Under normal circumstances the D4WMJTC has a correlation peak which increases quadratically with this spacing. In the TBJTC, however, the grating responsible for the correlation is formed by the interference between the plane wave and the joint spectra of the two images. The fringe spacing of this grating is insensitive to the object-reference separation. The digitally-controlled JTC correlation peak is also roughly invariant under object-reference spacing as long as that spacing is less than the limit provided by the pixel size of the SLM. In addition, photorefractives have a substantially large dynamic range and better spatial uniformity than SLMs.

In summary, our TBJTC outperformed the POF in terms of PNR and SNR, while achieving slightly better values than the nonlinear JTC with median thresholding. This superior performance results from noise compression in the joint transform plane.

Linear system correlators, such as the POF, CMF, cannot produce this noise compression. Therefore, all optimization results for linear correlator systems are invalid for our nonlinear JTC.

Out TBJTC performs similarly to the digitally-controlled JTC (DCJTC), which applies a digitally computed thresholding and binarization to the intensity detected in the transform plane and electronically addresses a SLM whose output is Fourier transformed to produce the correlation. Specifically, the TBJTC device possesses the same characteristics as the DCJTC, namely: 1) an increase in the signal-to-noise and peak-to-noise ratios for images in clutter; 2) an increase in discrimination ability; and 3) a reduced probability of false correlation peaks for noisy inputs.

We have also invented what we believe to be the first photorefractive TBJTC that performs just as well as, if not better than, a phase-only JTC. Moreover, this TBJTC enjoys the following advantages over the DCJTC: 1) the detector/computer SLM device at the filter plane is replaced by a photorefractive crystal and double cycling is not necessary; 2) implementing the photorefractive device in the reflective geometry provides exceedingly high spatial resolution in the joint transform plane; 3) the compression nonlinearity is tuned by adjusting the beam ratios in the TBJTC. This nonlinearity enhances the PNR in the correlation plane.

Since numerous variations of the aforesaid embodiments will occur to the skilled worker in the art, the scope of the invention will be restricted solely by the terms of the following claims and art recognized equivalents thereof.

What is claimed is:

1. A two beam coupling joint transform correlator comprising:

(a) a nonlinear photorefractive medium;

(b) image producing means for producing a signal beam including a pair of images to be correlated with each other;

(c) first Fourier transform means for simultaneously Fourier transforming said pair of images and directing the resulting joint spectra upon said nonlinear photorefractive medium;

(d) reference beam generating means for writing an interference pattern between the joint spectra and the reference beam upon the nonlinear photorefractive medium with a reference beam coherent with said signal beam; and (e) second Fourier transform means for inverse transforming the resulting signal formed upon the nonlinear photorefractive medium to produce an output correlation signal beam.

2. The correlator of claim 1 wherein said pair of images are positioned side-by-side with respect to each other.

3. The correlator of claim 1 wherein the reference beam is a clean beam.

4. The correlator of claim 1 wherein the signal beam and the reference beam are non-collinear.

5. The correlator of claim 4 wherein the signal beam and the reference beam intersect each other at an angle of about twenty degrees upon illuminating said photorefractive medium.

6. The correlator of claim 1 wherein said photorefractive medium is barium titanate.

7. The correlator of claim 1 wherein said reference beam generator means and said image producing means are positioned to direct the signal beam and the reference beam at one side of the nonlinear photorefractive medium.

8. The correlator of claim 7 wherein said reference beam generator means and said image producing means are positioned to direct the signal beam and the reference beam at the nonlinear photorefractive medium, with the output signal correlation beam co-propagating with the reference beam.

9. The correlator of claim 1 wherein said reference beam generator means and said image producing means are positioned to direct the signal beam and the reference beam at the nonlinear photorefractive-medium with the output signal correlation beam co-propagating with the reference beam.

10. A two beam coupling joint transform correlator comprising:

(a) a nonlinear two beam coupling medium;

(b) image producing means for producing a signal beam including a pair of images to be correlated with each other;

(c) first Fourier transform means for simultaneously Fourier transforming said pair of images and directing the resulting joint spectra upon said nonlinear two beam coupling medium;

(d) reference beam generating means for writing an interference pattern between the joint spectra and the reference beam upon the nonlinear two beam coupling medium with a reference beam coherent with said signal beam; and (e) second Fourier transform means for inverse transforming the resulting signal formed upon the nonlinear two beam coupling medium to produce an output correlation signal beam.

11. The correlator of claim 10 wherein said reference beam generator means and said image producing means are positioned to direct the signal beam and the reference beam at one side of the nonlinear two beam coupling medium.

12. The correlator of claim 11 wherein said reference beam generator means and said image producing means are positioned to direct the signal beam and the reference beam at the nonlinear two beam coupling medium, with the output correlation signal beam co-propagating with the reference beam.

13. The correlator of claim 10 wherein said reference beam generator means and said image producing means are positioned to direct the signal beam and the reference beam at the nonlinear two beam coupling medium with the output correlation signal beam co-propagating with the reference beam.

14. A two beam coupling joint transform correlator comprising:

(a) a nonlinear photorefractive medium;

(b) image producing means for producing a signal beam including a pair of images to be correlated with each other;

(c) first Fourier transform means for simultaneously Fourier transforming said pair of images and directing the resulting joint spectra upon said nonlinear photorefractive medium;

(c) reference beam generating means for illuminating he joint spectra upon the nonlinear photorefractive medium with a reference beam coherent with said signal beam;

(e) second Fourier transform means for inverse transforming the resulting signal formed upon the nonlinear photorefractive medium to produce an output correlation signal beam; and (f) wherein the reference beam is a clean beam having a substantially lesser intensity than the signal beam.

15. The correlator of claim 14 wherein the reference beam has an intensity of at least three orders of magnitude less that the signal beam.

16. A two beam coupling joint transform correlator comprising:

(a) a nonlinear photorefractive medium;

(b) image producing means for producing a signal beam including a pair of images to be correlated with each other;

(c) first Fourier transform means for simultaneously Fourier transforming said pair of images and directing the resulting joint spectra upon said nonlinear photorefractive medium;

(c) reference beam generating means for illuminating the joint spectra upon the nonlinear photorefractive medium with a reference beam coherent with said signal beam;

(e) second Fourier transform means for inverse transforming the resulting signal formed upon the nonlinear photorefractive medium to produce an output correlation signal beam; and (f) means for adjusting the beam intensity ratios.

\* \* \* \* \*